United States Patent [19]

Niemeyer et al.

[11] 3,806,821

[45] Apr. 23, 1974

[54] PULSE RATE RAMPING CIRCUIT

[75] Inventors: Thomas L. Niemeyer, Wollaston; Reade Williams, Hamilton, both of Mass.

[73] Assignee: USM Corporation, Flemington, N.J.

[22] Filed: Oct. 27, 1972

[21] Appl. No.: 301,669

[52] U.S. Cl. .................... 328/34, 318/415, 318/685, 318/696, 328/41, 328/44, 328/73

[51] Int. Cl. ........................ H03k 5/156, H03k 1/16

[58] Field of Search ............ 328/34, 41, 44, 48, 73, 328/74; 318/415, 685, 696; 307/225, 271

[56] References Cited

UNITED STATES PATENTS 2,563,841 8/1951 Jensen ............................ 328/48 X
3,456,200 7/1969 Bos ................................ 307/226 X
3,184,663 5/1965 Mergler ........................... 328/41 X
3,411,058 11/1968 Madsen et al. ...................... 318/696
3,582,751 6/1971 Rosshirt et al. ...................... 318/696

*Primary Examiner*—John Zazworsky
*Attorney, Agent, or Firm*—Ralph D. Gelling; Vincent A. White; Richard B. Megley

[57] ABSTRACT

A circuit for ramping up and down a pulse repetition rate of a train of pulses has first and second rate multipliers connected to modify an incoming train of pulses by the product of rate fractions of each rate multiplier. Circuit means are provided to appropriately vary the rate fractions of each multiplier for producing a desired ramp. Preferably, the rate fractions are simultaneously, complementally, linearly and reversibly variable for each rate multiplier. The circuit is preferably intended to drive stepping motors.

4 Claims, 5 Drawing Figures

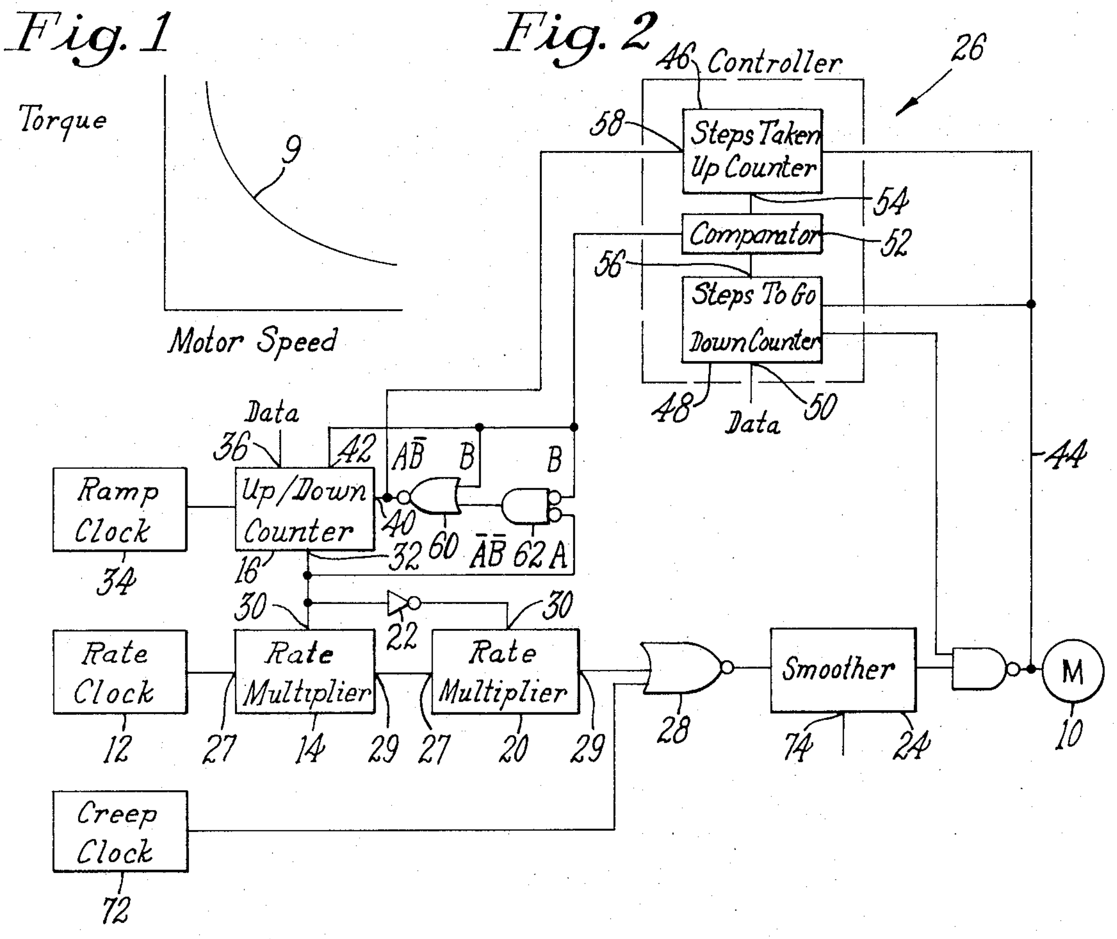
Fig. 1, Fig. 2
Fig. 3
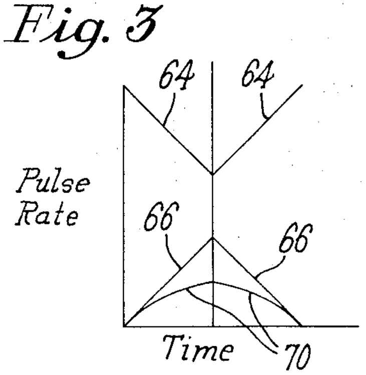
Fig. 4
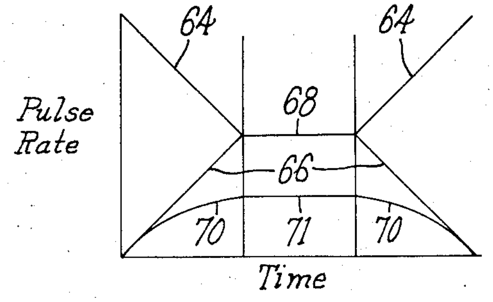
Fig. 5
| A | B | ĀB̄ | B | AB̄ |
|---|---|---|---|---|
| 0 | 0 | 1 | 0 | 0 |
| 1 | 0 | 0 | 0 | 1 |
| 0 | 1 | 0 | 1 | 0 |
| 1 | 1 | 0 | 1 | 0 |

PULSE RATE RAMPING CIRCUIT

BACKGROUND OF THE INVENTION

Modern technological devices often employ a series or train of pulses in their control or operation. The pulses may be electrical, fluidic, light or other forms as required in the operation of a particular device. For example, pulses may be employed in the control and operation of such devices as electrically driven stepping motors.

It is often convenient to generate the pulses of a train at a uniform repetition rate and to modify the pulse repetition rate of the train as required for a particular use of the pulses. For electrical pulses, for example, electronic circuits for the generation of a train of pulses at a uniform repetition rate are well known and commonly called clocks. Electronic circuits which modify a pulse repetition rate are also well known, one example being a rate multiplier.

Known rate multipliers such as that designated 7497 receive a train of pulses to be modified as from a clock and rate fraction data in the form of input signals representing a rate number. The rate multiplier then multiplies the clock pulses by the input data, i.e., the "rate fraction," to provide output pulses at a real time average rate equal to the product of the incoming pulse rate and the rate fraction. The real time average rate of output pulses then will be at a linear average gradient. As used herein the gradient of such output pulse repetition rates is called a ramp, and the pulse repetition rate as modified by a rate multiplier is the real time average rate and not a periodic or incremental pulse repetition rate.

It is desirable in certain application of such pulse trains to provide a ramp to the pulse repetition rate which is nonlinear. For example, the torque-speed characteristic of many stepping motors decreases at a nonlinear gradient as the speed of the motor is increased. For a stepping motor, as for other electric motors, the rotational speed of the motor constitutes the independent variable of the torque-speed characteristic function. Unlike other motors, however, the speed of a stepping motor is determined by the repetition rate of pulses used to drive the motor at fixed increments, usually of rotation, per pulse. If a motor driving pulse repetition rate were abruptly altered, the corresponding attempted speed change of the motor may require a torque in excess of that characteristic of the motor at its instantaneous speed. The motor then slips or skips steps and fails to operate according to the number and repetition rate of driving pulses. Such operation defeats the pulse proportional movement feature of stepping motors which normally makes their use desirable.

Accordingly, it is desirable to ramp the driving pulses according to the torque characteristic of the motor. Often this requires a nonlinear ramp. If the technically easier linear ramp is employed, larger and more costly stepping motors must be used than would be necessary if the pulse ramp more closely corresponding to the torque characteristic of the motor.

Solutions to this problem have been sought and tried. Some involve special purpose circuitry which is more expensive and difficult to assemble than incurred in use of commercially available integrated circuit components. Still other known solutions convert pulse repetition rates, which are inherently digital, into analogs of the rate; after operation on the analog signal to generate the desired ramp waveform, the analog is converted back to pulses either by analog to digital conversion or by analog feedback modification of the original digital pulse generation means. Such analog conversion destroys the precision of digital techniques. It is additionally difficult to obtain optimum ramp waveform for both up and down ramping with analog techniques. None of these solutions is, therefore, ideal.

SUMMARY OF THE INVENTION

Accordingly, it is an object of the invention to provide an improved circuit capable of modifying the pulse repetition rate of a train of pulses to a nonlinear ramp.

To this end, the invention provides a circuit for modifying a pulse repetition rate of a train of pulses along a ramp which is the product of variable rate fractions of first and second rate multipliers. The rate fractions of the two multipliers are initially set to values intermediate zero and unity. Means are provided to appropriately vary the rate fraction of each rate multiplier to a final value also intermediate zero and unity. The rate multipliers are connected to modify the pulse repetition rate of the pulse train by the product of their instantaneous rate fractions. The resulting pulse rate ramp may, of course, be nonlinear.

DESCRIPTION OF THE DRAWINGS

A preferred embodiment which is intended to be illustrative and not a limitation of the invention will now be described with reference to the attached drawings, in which:

FIG. 1 is a torque-speed characteristic for a typical rotational stepping motor the speed of which is to be controlled;

FIG. 2 is a schematic of a preferred control circuit embodiment;

FIG. 3 is a plot of the average output pulse rate vs. clock time for the operation of the preferred embodiment in one mode;

FIG. 4 is a plot of the average output pulse rate vs. clock time for the operation of the preferred embodiment in another mode; and FIG. 5 is a state table for a gate portion of the circuit in FIG. 2.

DESCRIPTION OF THE PREFERRED EMBODIMENT

FIG. 1 offers further, graphical illustration of the primary problem the invention is intended to solve. A typical stepping motor torque-speed characteristic 9 is shown; it will be appreciated from the Figure that the torque at higher motor speeds is less than at lower speeds. The maximum usable torque over a range of motor speeds is thus limited by the lower high speed torque. Of course, the utility of the invention is not limited to applications involving stepping motors but may include other applications where a ramped pulse rate is desirable.

FIG. 2 shows a schematic of the preferred embodiment in which pulses modified by the ramping circuit are used to drive a stepping motor 10 a step per pulse received by the motor. Pulses for driving the motor are generated at a uniform repetition rate by a rate clock 12. The uniform rate pulses are modified by a first rate multiplier 14 according to a rate fraction received from an up/down or reversible counter 16. The modified pulse rate from the first rate multiplier 14 is then further modified by a second rate multiplier 20 according to a second rate fraction also from the up/down counter 16. However, the second rate multiplier receives its rate fraction data via inverter 22 providing a rate fraction which is the complement of the rate fraction of the first rate multiplier 14. The pulse repetition rate is then made more periodically uniform by a smoothing circuit 24 for driving the stepping motor 10. Pulses used to drive the motor are also supplied to a controller generally at 26 which provides signals for the control of the that multipliers 14, 20 and motor 10.

The clock 12 generates a train of electrical pulses of substantially uniform pulse shape and pulse width at a periodically uniform pulse repetition rate, for example, from 16 to 160 kilohertz. The pulse repetition rate of the clock may exceed the maximum pulse repetition rate acceptable for driving the motor because the rate multipliers reduce the number of pulses transmitted from the clock to the motor. The rate multipliers 14 and 20 each have pulse input and output ports 27 and 29, respectively, conveying successively modified pulse rates from the clock to an OR gate 28, the function of which is explained below. Each rate multiplier additionally has a plurality of rate fraction input data ports 30 connected to a corresponding number of output ports 32 of the up/down counter 16. Since each of the actual ports 30 and 32 perform analogous functions, only a selected one of each is shown in schematic FIG. 2. It will be appreciated that the first and second rate multipliers may be composed of a plurality of rate multiplier circuit units to provide as many rate fraction input ports 30 as desired; additional input ports provide smaller steps between successive rate fractions of the rate multiplier. The rate multipliers may additionally have "enable" and "clear" input ports (not shown) appropriately connected to circuit means (not shown) for enabling and clearing operation of the rate multipliers. Although in certain applications it will be desirable to synchronize the rate fraction signals with pulses from the rate clock, asynchronous operation has been found successful in the preferred embodiment; no provision for such synchronization is therefore made in the circuit of FIG. 2.

Each rate multiplier operates to multiply the number of pulses received from the rate clock by the rate fraction. For example, where a rate fraction is one-fourth, every forth pulse received from the clock is provided as an output. In such operation the rate fraction is always in a range between zero and unity so that the output from each rate multiplier will vary from blocking all pulses received at the input port 27 to transmitting all pulses received at the input port. Some commercially available rate multipliers offering only a portion of this range may still be suitable in the circuit being described.

The inverter 22 serves to establish the initial and operating rate fractions of the second rate multiplier 20 relatively to those of the first rate multiplier. Accordingly, where the initial rate fraction of the first rate multiplier 14 is "X," the initial rate fraction of the second rate multiplier 20 is $y = f(x) = 1-X$. The rate fraction of the second rate multiplier is thus determined simultaneously but varied as the complement of the rate fraction of the first rate multiplier. Specifically, the inverter serves to change a negative to a positive logic state.

The up/down counter 16 provides a linearly varying sequence of rate fractions for use by the rate multipliers. The up/down counter pulses are generated by a ramp clock 34 adapted to provide a train of uniform output pulses at a pulse repetition rate conveniently lower than that of the rate clock 12, for example, from 2.9 to 29 kilohertz. Were the pulse repetition rate of the ramp clock 34 too close to that of the rate clock 12, the rate fractions of the rate multipliers would change before sufficient pulses had been received from the clock 12 to provide an output pulse from the rate multiplier. Synchronous operation of the counter 16 and rate multipliers may then be required, but is not required for the pulse rate values indicated.

The up/down counter 16 has a plurality of data input ports 36 only one of which is shown since their functions are analogous. A data number signal may be provided to store an initial reference number in the counter. Provision of an initial data number sets the rate fraction of each rate multiplier 14, 20 at a nonzero value, thereby increasing the absolute gradient of the ramp initially produced by each rate multiplier. Alternatively, the counter can be initially preset at zero. A load port (not shown) may be activated to permit the counter to receive data signals at the ports 36.

The up/down counter additionally has an enabling port 40 which normally permits counter operation but disables counter operation when an appropriate signal is received at the port 40. The up/down counter also has a port 42 which controls the direction of counting in the counter. When a low logic level appears at the port 42, pulses received from the ramp clock 34 cause the counter to count the pulses by sequential addition from a lower number to a higher number or upwardly. When a high logic level is received at the port 42, the up/down counter counts downwardly.

The controller generally at 26 (FIG. 2) supervises operation of the ramping circuit according to the number of pulses actually supplied to the motor 10. For this purpose, pulses supplied to the motor are also supplied to the controller by line 44. In the preferred embodiment, the controller is an appropriately programmed general purpose digital computer; however, the function of the controller in relation to the ramping circuit may be adequately represented in FIG. 2 by an up counter 46 and a down counter 48, each of which may be of the above described up/down type with the up or down control port (not shown) provided with an appropriate signal to cause the counter 46 to count upwardly and the counter 48 to count downwardly.

The down counter 48 additionally receives data at a plurality of ports 50 (only one shown in FIG. 2) to preset the counter to a number corresponding to the total number of steps it is desired to drive the motor 10 between motor-stopped conditions. Similar ports (not shown) on the counter 46 are grounded to enable the counter to be preset to zero. Each pulse which steps the motor is then carried to the counters 46 and 48 by the line 44 so that the instantaneous pulse count in the counter 46 corresponds to the number of steps taken by the motor and the instantaneous pulse count in the counter 48 corresponds to the number of steps the motor has yet to make to complete the desired number of steps. A comparator 52 may be formed by those skilled in the art from an expanded set of exclusive OR gates. It compares each of a plurality of output ports 54 (only one shown) of the counter 46 with a corresponding output port 56 (only one shown) of the counter 48 to provide a signal when and only when the number of steps taken by the motor as recorded in the up counter 46 equals the number of steps the motor has yet to go as recorded in the down counter 48.

The down counter 48 may have an unused enable port (not shown) while an enable port 58 of the counter 46 is connected to the enable port 40 of the up/down counter 16. Both enable ports 40 and 58 receive a signal from a pair of exclusive OR gates 60 and 62 which appropriately and simultaneously disable both the up/down counter 16 and the up counter 46. The gate 60 receives as input signals the output signal from the comparator 52 and the gate 62. The gate 62 also receives input signals from the comparator 52 and from the highest significant figure output port of the up/down counter which is the port 32 selected for illustration in FIG. 2. For convenience, FIG. 5 shows a table of possible signal combinations from the up/down counter 16, identified as A, and from the comparator 52, identified as B. As indicated in the table of FIG. 5, the gates 60 and 62 in FIG. 2 will provide a disabling signal only when the comparator is unsatisfied and the up/down counter 16 has reached its highest significant figure. The unsatisfaction of the comparator indicates that the motor has completed less than half the number of steps required, while the signal at the port 32 indicates that the up/down counter is half full, a point of convenience for providing a signal after each output of the up/down counter has provided at least one signal to the rate multipliers.

When the up/down counter is disabled, the rate fractions of the rate multipliers will remain fixed. Since the port chosen for disabling the up/down counter represents one half the counter capacity, the rate fractions of each of the rate multipliers 14 and 20 will have been driven to one half and the product of the rate fractions will be one quarter. When the up-counter 46 is disabled, the number then stored in the counter represents the number of steps the motor has taken during the upward ramp of the pulse repetition rate by the rate multipliers. When the steps-to-go counter 48 reaches a number corresponding to that of the then disabled up-counter 46 the comparator 52 will generate a signal which will simultaneously reactivate the up/down counter 16, give it a downward direction of count and reactivate the counter 46. As the up/down counter 16 counts downwardly, the rate fractions of the rate multipliers 14 will return to their initial values. The means for varying the rate fractions is thus reversible. Since the number of steps to go corresponds with the number of steps taken in the upward ramp of the motor pulse repetition rate, the downward ramp will have a number of steps corresponding to the upward ramp.

This first mode of operation of the ramping circuit is illustrated in FIG. 4 in which the pulse rate modification by the rate multiplier 14 during operation of the up/down counter 16 is illustrated by line segments 64, that of the rate multiplier 20 during operation of the up/down counter by line segments 66, and the operation of each rate multiplier while the up/down counter 16 is disabled, by line segment 68. The output product of the pulse rate which corresponds to the modification of the pulse repetition rate is illustrated by line segments 70 and 71. It will be appreciated that the up and down ramp segments 70 are mirror images, symmetrical and substantially parabolic while the segment 71 corresponding with the line segment 68 is linear.

FIG. 3 illustrates a second mode of operation of the ramping circuit in which the number of steps to be taken by the motor as provided at the data port 50 is less than that required to have the up/down counter 16 reach its half full condition. In this mode, the comparator 52 will generate a signal representing a 1 to 1 match between the number of steps taken by the motor as recorded in the up counter 46 and the number of steps the motor has yet to go as recorded in the down counter 48 before the up/down counter is disabled. The signal from the comparator will immediately cause the up/down counter to count downwardly which, in turn, immediately causes the rate multipliers 14 and 20 to begin to return to their initial rate fractions. In this mode the up and down ramps 70 of the pulse repetition rate remain mirror image, symmetrical and substantially parabolic, but achieve a value of less than one quarter of the rate clock rate and have no linear region connecting the up and down ramps. Again, the operation over a number of pulses of the rate multiplier 14 is indicated by line segments 64, that of the rate multiplier 20 by line segments 66, and the output product pulse rate by line segment 70. Returning to FIG. 2, a creep clock 72 provides pulses at a repetition rate generally slower than either clocks 12 or 34, for example, from 0.42 to 4.2 kilohertz. It will be appreciated that this pulse repetition rate is substantially below that of the clock 12; hence, the name "creep clock." Output pulses from the creep clock 72 are added to the pulses from the clock 12, as modified by the rate multipliers 14 and 16, by the OR gate 28. If, because of a malfunction or an anomaly, the rate fraction of the rate multiplier 20 reaches zero and blocks all pulses to the motor from the rate clock 12 prior to the actual completion of the number of steps called for by the counter 48, the pulses from the clock 72 will step the motor 10 the remaining steps. During operation of the rate multipliers 14 and 20, pulses from the clock 72 will additionally operate the motor. However, they occur at a repetition rate sufficiently below that of the clock 12 as modified by the rate multipliers so as not to substantially interfere with the operation of the ramping circuit.

Finally, the smoother 24 operates to further modify the pulse train received from the rate multipliers by making the pulses of the train more periodically uniform. It will be remembered that the rate multipliers modify the pulses to a real time average rate which may have substantial instantaneous real time or period variations between successive pulses. Further instantaneous pulse period variance is introduced by the creep clock. Although the motor may receive such aperiodic pulses, smoother motor operation results from more uniform pulse periods. For such pulse period smoothing, it is known to use an integrator circuit or, as in the preferred embodiment, a frequency divider. It is preset to a fixed rate fraction by rate fraction input data at its input port 74. Since the number of pulses transmitted is further reduced, thereby reducing the probability of substantial pulse period variance, and the instantaneous periods between pulses are increased, thereby reducing the percent variance in pulse periods, the output of the smoothing rate multiplier advantageously is a more uniformly periodic pulse train.

Having thus described our invention, what we claim as new and desire to secure by Letters Patent of the United States is:

1. A circuit for modifying the pulse repetition rate of a train of pulses used to energize and run an automatically controlled stepping motor through a specific operation comprising:

A. a first rate multiplier connected to receive the pulse train, said first multiplier having a variable rate fraction;

B. a second rate multiplier connected to receive the pulse train as modified by the first rate multiplier, said second multiplier also having a variable rate fraction; and C. signal generating means connected to the rate multipliers to vary the rate fractions thereof in a manner which causes the pulse repetition rate of the pulse train, as modified by the product of the rate fractions of each multiplier, to vary in a manner consistent with the torque requirements of the stepping motor during acceleration and deceleration thereof.

2. A circuit for modifying the pulse repetition rate of a train of pulses used to energize and run an automatically controlled stepping motor through a specific operation as described in claim 8 wherein the signal generating means comprises:

A. a clock pulse generator;

B. an up and down counter connected to receive pulses from the clock pulse generator and to generate output signals for varying the rate fractions of the first and second rate multipliers; and C. means connecting the up and down counter to the first and second rate multipliers to vary the rate fractions thereof according to first and second rates respectively, said first and second rates being substantially the inverse of each other.

3. A circuit for modifying the pulse repetition rate of a train of pulses used to energize and run an automatically controlled stepping motor through a specific operation as described in claim 8 further comprising:

A. means for disabling the rate fraction varying means; and

B. a controller for recording the number of steps taken before the rate fraction varying means are disabled, comparing said information with the number of steps remaining to complete the operation, and generating a signal to restart and reverse the varying means when said steps taken equal said steps remaining.

4. A circuit for modifying the pulse repetition rate of a train of pulses used to energize and run an automatically controlled stepping motor through a specific operation comprising:

A. a first rate multiplier connected to receive the pulse train, said first multiplier having a variable rate fraction;

B. a second rate multiplier connected to receive the pulse train as modified by the first rate multiplier, said second multiplier also having a variable rate fraction;

C. a clock pulse generator;

D. an up and down counter connected to receive pulses from the clock pulse generator and to generate output signals for varying the rate fractions of the first and second multipliers;

E. means connecting the up and down counter to the first and second rate multipliers to vary the rate fractions thereof according to first and second rates respectively, said first and second rates being substantially the inverse of each other;

F. means for disabling the up and down counter; and

G. a controller for recording the number of steps taken before the up and down counter is disabled, comparing said information with the number of steps remaining to complete the operation, and generating a signal to restart and reverse the up and down counter when said steps taken equal said steps remaining.

* * * * *